United States Patent
Drerup et al.

(10) Patent No.: US 6,801,977 B2
(45) Date of Patent: Oct. 5, 2004

(54) METHOD AND APPARATUS FOR PASSING MESSAGES THROUGH A BUS-TO-BUS BRIDGE WHILE MAINTAINING ORDERING

(75) Inventors: Bernard Charles Drerup, Austin, TX (US); Richard Nicholas Iachetta, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/042,096

(22) Filed: Jan. 7, 2002

(65) Prior Publication Data

US 2003/0131176 A1 Jul. 10, 2003

(51) Int. Cl.[7] .............................................. G07F 13/36
(52) U.S. Cl. ..................................................... 710/311
(58) Field of Search ................................ 710/311, 310, 710/35, 262

(56) References Cited

U.S. PATENT DOCUMENTS

| | | | | |
|---|---|---|---|---|
| 5,535,341 A | * | 7/1996 | Shah et al. | 710/310 |
| 5,579,530 A | * | 11/1996 | Solomon et al. | 710/35 |
| 5,588,125 A | * | 12/1996 | Bennett | 710/306 |
| 5,758,166 A | * | 5/1998 | Ajanovic | 710/240 |
| 5,768,548 A | * | 6/1998 | Young et al. | 710/306 |
| 5,778,236 A | * | 7/1998 | Gephardt et al. | 710/266 |
| 5,894,587 A | * | 4/1999 | Normoyle et al. | 710/310 |
| 5,897,667 A | * | 4/1999 | Miller et al. | 711/218 |
| 5,941,964 A | * | 8/1999 | Young et al. | 710/100 |
| 6,115,551 A | * | 9/2000 | Chao | 710/62 |
| 6,219,737 B1 | * | 4/2001 | Chen et al. | 710/310 |
| 6,629,179 B1 | * | 9/2003 | Bashford | 710/260 |
| 2001/0032287 A1 | * | 10/2001 | Lai et al. | 710/260 |

* cited by examiner

Primary Examiner—Paul R. Myers
(74) Attorney, Agent, or Firm—Carr LLP; Robert M. Carwell

(57) ABSTRACT

An apparatus and method for passing messages through a bus-to-bus bridge while maintaining ordering. The method comprises passing messages into a message container in the bus bridge without using the bridge buffer, setting a flag that tracks all the writes in the write queue ahead of when the message was put into the message container, blocking the receiving device on the bus connected to the bridge from accessing the message container until the flag is cleared, and clearing the flag when all the writes put into the write queue ahead of when the flag was set have been written to local memory on the receiving bus, then allowing the device on the receiving bus that is the intended recipient to receive the message.

20 Claims, 3 Drawing Sheets

METHOD AND APPARATUS FOR PASSING MESSAGES THROUGH A BUS-TO-BUS BRIDGE WHILE MAINTAINING ORDERING

BACKGROUND

In distributed microprocessing systems, typically each processor and the devices associated with that processor are connected to a bus. Multiple processors and devices can be connected to a single bus. Processors and devices can transmit information across the bus. In many systems today, to allow more total devices, multiple busses are connected by bus bridges that allow devices on one bus to access devices on another bus. Some bus bridges are unidirectional, meaning information can only flow in one direction, while other bus bridges are bi-directional, meaning information can flow in both directions. A bus bridge will forward read or write transaction requests that originate on one bus to another bus in the system. Typically, the first device to request access to the bus is granted access to the bus for a predetermined period of time. Most bridges use some form of "round-robin" rules to control traffic on the bus, wherein the most recent device that has been granted access to the bridge to transmit information will become last in line to gain access again, and the least recent device that has a request pending will be the next to be granted access to the bridge. This logic is designed to ensure that each device has equal access to the bus.

Bus to bus bridges forward standard transactions like memory reads, memory writes, I/O reads and I/O writes from a device connected to one bus on the bridge to a device on another bus on the bridge. Some bridges also forward a type of transaction called a "message". The act of forwarding a message from one side of the bridge to the other is called "message passing". Messages are typically stored in a message container inside the bridge. When a message is being forwarded across a bridge, it typically generates an interrupt to let the CPU on the receiving end know that the message has arrived. The receiving CPU typically clears the interrupt by zeroing out some or all of the message after the message has been read. In some systems, the receiving CPU will send a message to the sending CPU to indicate that the message has been received. In a system in which the receiving CPU does not send such a message, the sending CPU will typically poll the message container to determine if the message has been zeroed out so it can determine when the message has been received.

Messages are typically sent for the purpose of informing a receiving CPU that a certain block of data has been read or written to memory. In order to minimize latency in the system, bridges typically "post" writes in the bridge. This means that the bridge accepts write data into the bridge to the extent of its buffering capability, thus completing the write transaction on the sending bus as soon as possible. The bridge then begins to write the data in its buffers onto the local memory of the appropriate receiving bus. However, the amount of time this can take may vary because the bridge may not gain ownership of the receiving bus right away, and because the receiving bus may force the bridge to break up the write into multiple transactions which themselves may be interleaved with transactions of other devices. The consequence of this is that the write transaction is complete on the sending bus for an indeterminate amount of time before it is actually completed on the receiving bus. Therefore, if the sending CPU sends a message that it has completed a write function, some portions of the write transaction may still be in the bus bridge waiting to complete the entire write transaction. This could cause incorrect data to be received if the message that the write transaction was completed is received by the receiving CPU before all the blocks of the write transaction are received into memory on the bus on the destination side of the bridge. To overcome this problem, the messages must follow the same set of ordering rules that are followed by normal write transactions being sent across the bridge.

One solution to this problem has been to put the messages themselves in the same queue as the transactions. A bridge typically has one or more write buffers that receive write blocks. Each buffer can accommodate a block of the size that can be managed easily by the bridge. If a message is put into the write queue with the write transaction, after the last block of the write data, then the message will be placed into the queue behind the transaction, and into a subsequent write buffer. This ensures the message will not be sent until the last block of the write is sent. When the message gets to the top of the queue, it is put into the message container, rather than being written into the destination bus memory, and the interrupt is generated. However, even if a particular block of data is smaller than the buffer size, it is typically put into a buffer by itself, and no additional data is put into that particular buffer. This is because managing transactions of varying sizes in a buffer is difficult for a bridge, and so bridges are usually not configured that way. A message is typically of a small size. By putting a message into the write queue, it will occupy an entire buffer that could be used for subsequent write transactions, instead. This reduces system performance.

Accordingly, a continuing search has been directed to the development of systems and methods which can send a message to the message container without having to utilize the write queue, while still maintaining ordering of the data in the write queue and the subsequent message.

SUMMARY

The present invention, accordingly, provides a system and method that involves putting the message directly into the message container without having to utilize the write queue, and ensuring the message is sent in order by setting a flag in the bridge logic that keeps track of which buffers in the queue were pending when the message was received, and not sending the message until all those buffers have been emptied.

The invention comprises a method and apparatus for delivering an incoming message in a system comprising a bus bridge and at least two buses connected to the bus bridge. A message from a device on a first bus on the bus bridge is transmitted into a message container on the bus bridge. The bus bridge tracks all data write functions in buffers on the bus bridge when the message is received in the message container. The system sets a flag that blocks generation of an interrupt indicating to a receiving device on a second bus on the bus bridge that the message is in the message container. The flag being set also prevents the receiving device on the second bus from accessing the message in the message container. When all data write functions in the bus bridge buffer being tracked have been written, the system sends a signal that clears the flag so the receiving device on the second bus can read the message in the message container.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
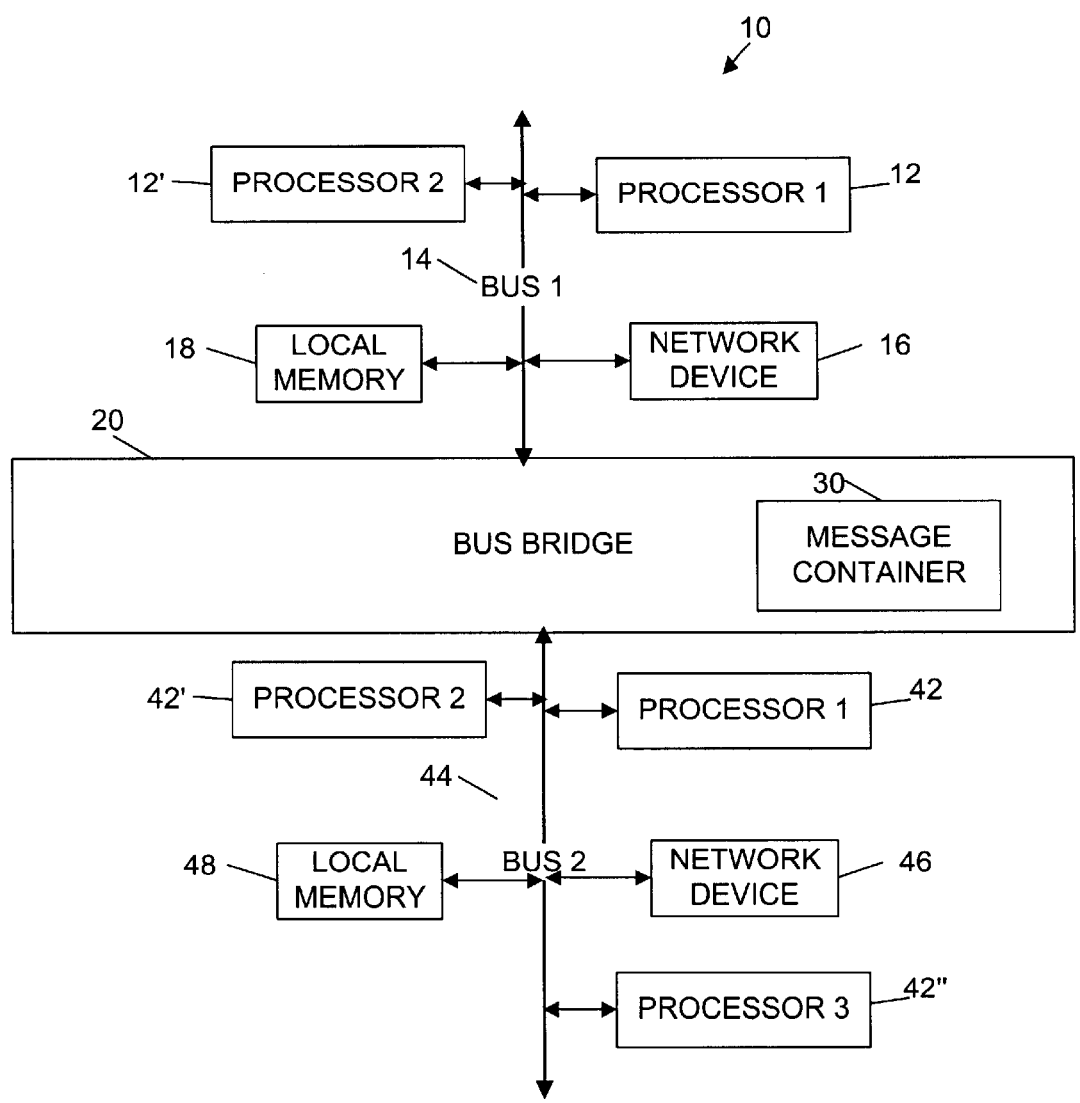
FIG. 1 is a high-level conceptual block diagram of a microprocessor system through which messages could be passed.

In the discussion of the FIGURES, the same reference numerals will be used throughout to refer to the same or similar components. In the interest of conciseness, well-known elements and details, such as timing considerations and the like have been omitted inasmuch as such details are not considered necessary to obtain a complete understanding of the present invention, and are considered to be within the skills of persons of ordinary skill in the relevant art.

FIG. 1 represents a typical system configuration 10 that could utilize the present invention to pass messages across the bus bridge without having to utilize the bus bridge buffer to send the message. In the configuration of the system 10 shown in FIG. 1, there are two buses 14, 44 connected to the bus bridge 20. The buses are bi-directional, and pass information, including data and commands, into and out of the devices connected to that bus. The bus bridge 20 is bi-directional, but systems with unidirectional bridges also exist. Unidirectional bus bridges 20 only process information in a single direction, while bi-directional bus bridges 20 process information in both directions. The first bus 14 has two processors 12, 12', a network I/O device 16, and local memory 18 connected to the bus 14. The second bus 44 has three processors 42, 42', 42", a network I/O device 46, and local memory 48 connected to the bus 44. Data that is to be sent from a device connected to one bus to a device on another bus is typically placed in the local memory of the destination bus. If a processor 12 on the first bus 14 needs to write data to a processor 42' on the second bus 44, the first processor 12 will output a write request onto the bus 14 where it will be accepted by the bus bridge 20. When the bus bridge 20 has sufficient resources, it will accept the write request and place it in a buffer on the bus bridge 20. If the block of data to be written is large, the data to be written will be broken into transactions of a size that can be managed by the system and the bridge 20. Each write transaction will run on the first bus 14 and will be posted into a buffer on the bus bridge 20. When all the data to be written has been placed on the first bus 14, the first processor 12 considers the write operation to be complete. The first processor 12 then sends a message that the write is complete to the message container 30 in the bus bridge 20. As each data transaction is placed in a buffer on the bus bridge 20, the bus bridge 20 will route the data onto the bus 44 for the appropriate processor 42' connected to the bus bridge 20 that is to be the recipient of the write being executed by the first processor 12. The bus bridge 20 will place the data into the local memory 48 on the receiving bus 44. The processor 42' that is to be the recipient of the of the data will read the data from the local memory 48 when it receives the message that the data to be read is in local memory 48.

Figure 2:
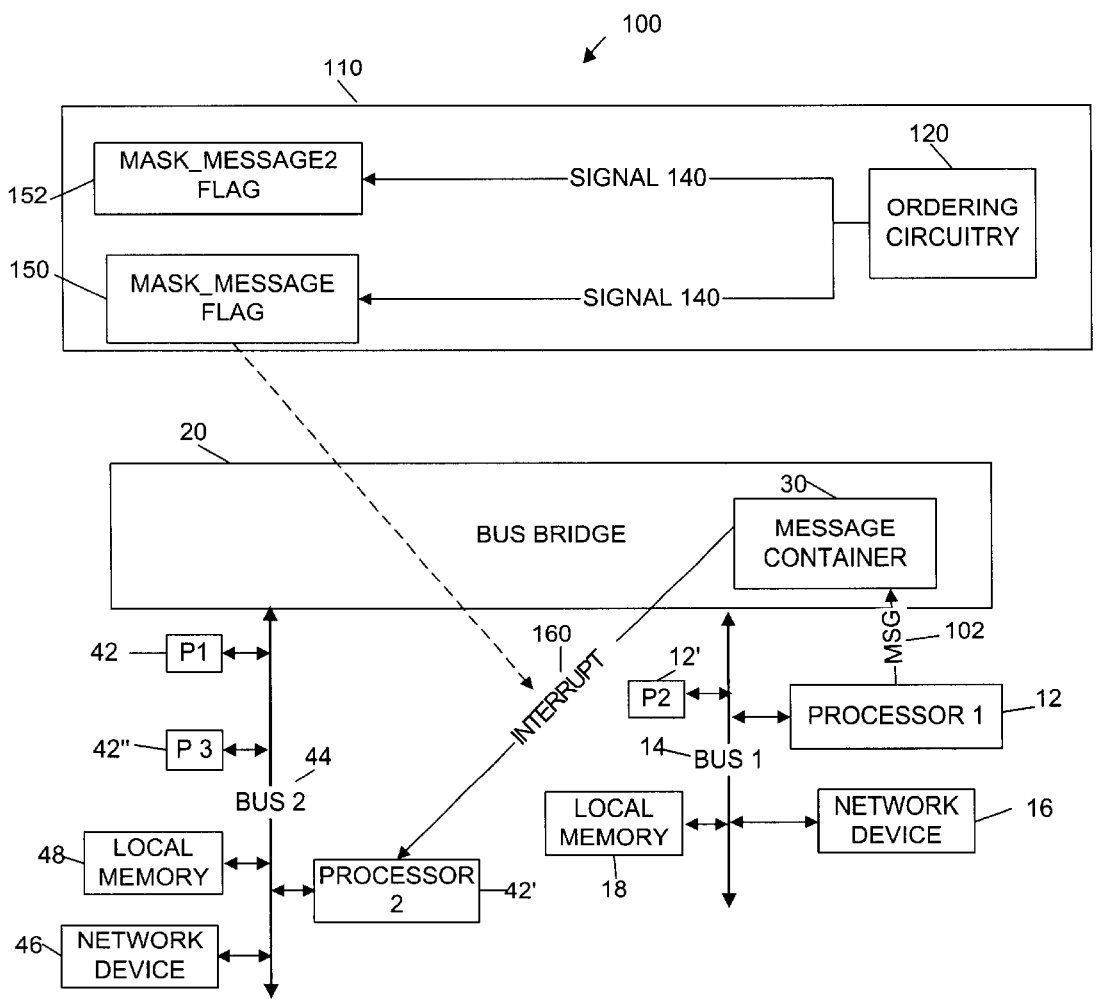
FIG. 2 is a high-level conceptual block diagram illustrating a portion of a microprocessor system incorporating the message passing system of the present invention.

FIG. 2 depicts a system 100 of the present invention that is designed to pass messages across the bus bridge without having to utilize the bus bridge buffer to send the message. When the first processor 12 has placed all the blocks of data to be written for the write command into the bus bridge 20, the processor 12 considers the write transaction to be complete. The processor 12 then sends a message 102 indicating that the write is complete. The message 102 is placed in the message container 30 on the bus bridge 20. Because the sending bus will not generate a message until it considers the write is complete, ordering is always maintained on the sending bus. The ordering problems only arise once at least a portion of the write data and message are placed into the bus bridge 20.

When the message 102 is placed in the message container 30 on the bus bridge 20, the bus bridge logic circuitry 110 sets a flag called MASK_MESSAGE 150 and polls the bus bridge 20 to determine which write buffers currently contain data to be written. This information is stored in a bus bridge ordering logic circuit 120 in the bus bridge logic circuitry 110. Setting the MASK_MESSAGE flag 150 blocks generation of an interrupt 160 to the receiving processor 42' that would indicate to the receiving processor 42' that a message has been sent and is waiting for it in the message container 30.

Additionally, because the receiving processor 42' may not use interrupts, but may poll the message container 30 to see if there are messages intended for the receiving processor 42' in the message container 30, the MASK_MESSAGE flag 150 being set also prevents the receiving processor 42' from accessing the message container 30. In one embodiment of the present invention, this is accomplished by making the message container 30 send a "retry" to all access requests when the MASK_MESSAGE flag 150 is set. In another embodiment of the present invention, this is accomplished by allowing the receiving processor 42' to access the message in the message container 30, but setting the "message valid" field associated with the message to zero when the MASK_MESSAGE flag 150 is set. In this way, the receiving processor 42' can access the message in the message container 30, but will ignore the message, believing it to be invalid.

When all the write buffers tracked by the bus bridge ordering circuit 120 because they contained data ahead of the message have delivered the data to the appropriate receiving bus, the ordering circuit 120 sends a signal 140 to the bus bridge logic circuitry 110 to clear the MASK_MESSAGE flag 150. This unblocks generation of the interrupt 160, allowing the message container 30 to indicate to the receiving processor 42' that a message has arrived, and allows the receiving processor 42' to access the message container 30 and receive and read the message.

In one embodiment of the present invention, the bus bridge 20 supports data flow in two directions. In this situation, a second flag, MASK_MESSAGE2 152 exists that can also be set by the bus bridge logic circuitry 110 and masks flow of messages in the other direction on the bus bridge 20.

Figure 3:
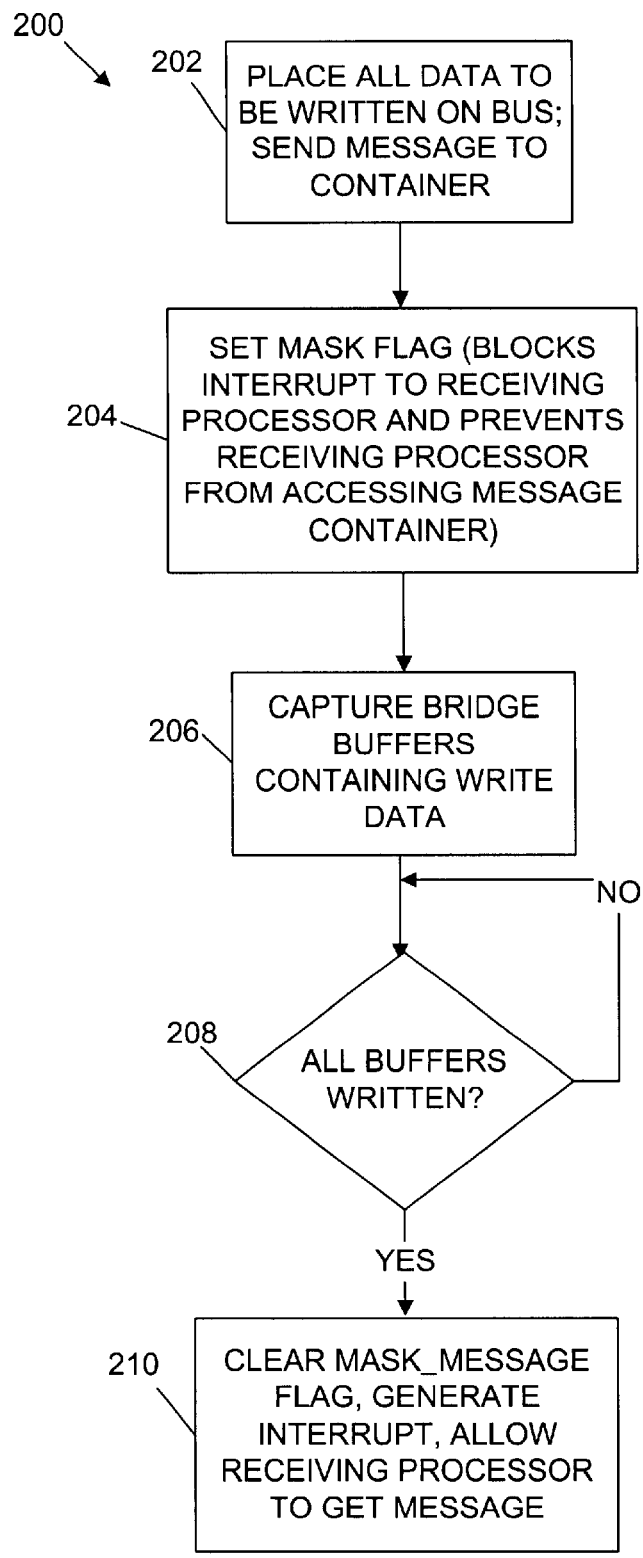
FIG. 3 is a flow chart representing the processing flow utilizing the bus bridge message passing system of the present invention.

FIG. 3 shows the logic flow 200 that occurs in a system of the present invention that is designed to pass messages across the bus bridge without having to utilize the bus bridge buffer to send the message. In step 202, a processor has placed all the data to be written for a particular write command onto the bus, and sends a message to the message container on the bus bridge indicating that the write is complete. At step 204, when the message is placed in the message container on the bus bridge, the MASK_MESSAGE flag is set. This blocks generation of an interrupt that would tell the receiving processor that a message is waiting for it in the message container, and prevents the receiving processor from accessing the message container. Additionally, when the MASK_MESSAGE flag is set, at step 206 the bus bridge logic circuitry identifies the write buffers currently containing data to be written. At step 208, the bus bridge continually polls the bridge buffers to determine when all the buffers identified as containing data to be written at step 206 have written all the data in the buffer to the appropriate receiving bus. At that point the bus bridge will clear the MASK_MESSAGE flag. At step 210, when the all the data in the buffers has been written to memory on the receiving bus, the MASK_MESSAGE flag is cleared, the bus bridge will generate an interrupt to the receiving processor to tell it there is a message waiting for it in the message container, and will allow the receiving processor to access the message container.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention. It is further noted that, unless indicated otherwise, all functions described herein are performed by a processor such as a computer or electronic data processor in accordance with code such as computer program code, software, or integrated circuits that are coded to perform such functions.

What is claimed is:

1. A method for delivering an incoming message in a system comprising a bus bridge and at least two buses connected to the bus bridge, the method comprising:
   a) transmitting a message from a device on a first bus to the bus bridge;
   b) receiving the message in a message container in the bus bridge;
   c) tracking any data write functions in buffers in the bus bridge when the message is received in the message container;
   d) setting of a first flag that blocks generation of an interrupt indicating to a receiving device on a second bus on the bus bridge that the message is in the message container;
   e) preventing the receiving device on the second bus from accessing the message in the message container while the first flag is set;
   f) generating a signal in the bus bridge when all data write functions in the bus bridge buffer being tracked have been written;
   g) responsive to the signal, clearing the first flag so the receiving device on the second bus can read the message in the message container; and
   h) responsive to the signal, un-blocking the generation of the interrupt indicating to the receiving device on the second bus on the bus bridge that the message is in the message container.

2. The method of claim 1 wherein the first flag is set, the receiving device on the second bus is sent a retry signal to prevent the receiving device from accessing the message in the message container.

3. The method of claim 1 wherein the first flag is set, the message valid field for the message container is set to zero, preventing the receiving device on the second bus from reading the message in the message container.

4. The method of claim 1 wherein the bus bridge has bi-directional data flow, the method further comprising:
   a) transmitting a message from a device on a second bus to the bus bridge in a second direction to the first bus on the bus bridge;
   b) receiving the message in a message container in the bus bridge;
   c) tracking any data write functions in buffers in the bus bridge when the message is received in the message container;
   d) setting of a second flag that blocks generation of an interrupt indicating to a receiving device on the first bus on the bus bridge that the message is in the message container;
   e) preventing the receiving device on the first bus from accessing the message in the message container while the second flag is set;
   f) generating a signal in the bus bridge when all data write functions in the bus bridge buffer being tracked have been written;
   g) responsive to the signal, clearing the second flag so the receiving device on the first bus can access the message in the message container; and
   h) responsive to the signal, un-blocking the generation of the interrupt indicating to the receiving device on the first bus on the bus bridge that the message is in the message container.

5. The method of claim 4 wherein when the second flag is set, the receiving device on the first bus is sent a retry signal to prevent the receiving device from accessing the message in the message container.

6. The method of claim 4 wherein the second flag is set, the message valid field for the message container is set to zero, preventing the receiving device on the first bus from reading the message in the message container.

7. A method for delivering an incoming message to a message container in a bus bridge having one or more buffers, the method comprising:
   a) transmitting the incoming message to the message container;
   b) tracking each of the one or more buffers in the bus bridge containing a data write function when the incoming message is received in the message container;
   c) setting a flag to prevent a receiving device connected to the bus bridge from reading the incoming message in the message container;
   d) unsetting the flag when each of the buffers in the bus bridge being tracked has completed the data write function; and e) allowing the receiving device to read the incoming message in the message container when the flag is unset.

8. An apparatus for delivering a message in a system utilizing buses connected by a bus bridge, the system comprising:
   a) means for a device on a first bus to transmit a message to the bus bridge;
   b) means for a message container in the bus bridge to receive the message;
   c) means for tracking all data write functions in the bus bridge buffer when the message is received in the message container;
   d) means for setting a first flag that prevents generation of an interrupt indicating that the message has been received in the message container;
   e) means for preventing the receiving device on the second bus from accessing the message in the message container when the first flag is set;
   f) means for sending a signal in the bus bridge when all data write functions that were in the bus bridge buffer when the message was received in the message container have been written;
   g) means for clearing the first flag responsive to the signal, so the receiving device on the second bus can access the message in the message container; and
   h) means for un-blocking the generation of the interrupt responsive to the signal, so the receiving device on the second bus can retrieve the message in the message container.

9. The apparatus of claim 8 wherein the system prevents the receiving device on the second bus from accessing the message in the message container when the first flag is set by telling the second bus to retry accessing the message container.

10. The apparatus of claim 8 wherein the system prevents the receiving device on the second bus from accessing the message in the message container by setting a message valid field to zero so the receiving device on the second bus does not read the message.

11. The apparatus of claim 8 wherein the bus bridge has bi-directional data flow, the system further comprising:
   a) means for a device on a second bus to transmit a message to the bus bridge;
   b) means for a message container on the bus bridge to receive the message;
   c) means for tracking all data write functions in the bus bridge buffer when the message is received in the message container;
   d) means for setting a second flag that prevents generation an interrupt indicating that the message has been received in the message container;
   e) means for preventing the receiving device on the first bus from accessing the message in the message container when the second flag is set;
   f) means for sending a signal in the bus bridge when all data write functions that were in the bus bridge buffer when the message was received in the message container have been written;
   g) means for clearing the second flag responsive to the signal, so the receiving device on the first bus can access the message in the message container; and
   h) means for un-blocking the generation of the interrupt responsive to the signal, so the receiving device on the first bus can retrieve the message in the message container.

12. The apparatus of claim 11 wherein the system prevents the receiving device on the first bus from accessing the message in the message container when the second flag is set by telling the first bus to retry accessing the message container.

13. The apparatus of claim 11 wherein the system prevents the receiving device on the first bus from accessing the message in the message container by setting a message valid field to zero so the receiving device on the first bus does not read the message.

14. An apparatus for delivering an incoming message to a message container in a bus bridge having one or more buffers, the apparatus comprising:
   a) means for transmitting the incoming message to the message container;
   b) means for tracking each of the one or more buffers in the bus bridge containing a data write function when the incoming message is received in the message container;
   c) means for setting a flag to prevent a receiving device from reading the incoming message in the message container;
   d) means for unsetting the flag when the each of the buffers in the bus bridge being tracked has completed the data write function; and
   e) means for allowing the receiving device to read the incoming message in the message container when the flag is unset.

15. A computer program product for delivering messages in a system utilizing devices on buses connected by a bus bridge, the computer program product comprising:
   a) computer program code for a device on a first bus transmitting a message to the bus bridge;
   b) computer program code for a message container in the bus bridge receiving the message;
   c) computer program code for tracking all data write functions in the bus bridge buffer when the message is received in the message container;
   d) computer program code for setting a first flag that prevents generation of an interrupt indicating that the message has been received in the message container;
   e) computer program code for preventing the receiving device on the second bus from accessing the message in the message container when the first flag is set;
   f) computer program code for sending a signal in the bus bridge when all data write functions that were in the bus bridge buffer when the message was received in the message container have been written;
   g) computer program code for clearing the first flag responsive to the signal, so the receiving device on the second bus can access the message in the message container; and
   h) computer code for un-blocking the generation of the interrupt responsive to the signal, so the receiving device on the second bus can retrieve the message in the message container.

16. The computer program product of claim 15 further comprising computer program code for preventing the receiving device on the second bus from accessing the message in the message container when the first flag is set by telling the second bus to retry accessing the message container.

17. The computer program product of claim 15 further comprising computer program code for the system preventing the receiving device on the second bus from accessing the message in the message container by setting a message valid field to zero so the second bus does not read the message.

18. The computer program product of claim 15 further comprising computer program code for bus bridge permitting bi-directional data flow, the computer program product further comprising:
   a) computer program code for a device on a second bus transmitting a message to the bus bridge;
   b) computer program code for a message container in the bus bridge receiving the message;
   c) computer program code for tracking all data write functions in the bus bridge buffer when the message is received in the message container;
   d) computer program code for setting a second flag that prevents generation an interrupt indicating the message has been received by the message container;
   e) computer program code for preventing the receiving device on the first bus from accessing the message in the message container when the second flag is set;
   f) computer program code for sending a signal in the bus bridge when all data write functions that were in the bus bridge buffer when the message was received in the message container have been written;
   g) computer program code for clearing the second flag responsive to the signal that all data write functions have been written, so the receiving device on the first bus can access the message in the message container; and
   h) computer code for un-blocking the generation of the interrupt responsive to the signal, so the receiving device on the first bus can retrieve the message in the message container.

19. The computer program product of claim 18 further comprising computer program code for preventing the receiving device on the first bus from accessing the message in the message container when the second flag is set by telling the first bus to retry accessing the message container.

20. The computer program product of claim 18 further comprising computer program code for preventing the receiving device on the first bus from accessing the message in the message container by setting a message valid field to zero so the first bus does not read the message.

* * * * *